United States Patent
Blume et al.

(10) Patent No.: US 7,012,637 B1
(45) Date of Patent: Mar. 14, 2006

(54) CAPTURE STRUCTURE FOR ALIGNMENT OF MULTI-CAMERA CAPTURE SYSTEMS

(75) Inventors: Leo R. Blume, Palo Alto, CA (US); Gary P. Louzon, Monte Nido, CA (US)

(73) Assignee: Be Here Corporation

( * ) Notice: Subject to any disclaimer, the term of this patent is extended or adjusted under 35 U.S.C. 154(b) by 892 days.

(21) Appl. No.: 09/917,606

(22) Filed: Jul. 27, 2001

(51) Int. Cl.
*H04N 5/225* (2006.01)
*H04N 7/18* (2006.01)
*H04N 9/47* (2006.01)
*H04N 7/14* (2006.01)
*H04N 5/38* (2006.01)

(52) U.S. Cl. ............. 348/218.1; 348/143; 348/159; 348/157; 348/14.09; 348/21; 348/38; 348/39; 348/47; 348/48; 348/211.11

(58) Field of Classification Search .......... 348/143, 348/159, 157, 14.09, 21, 38, 39, 47, 48, 211.11, 348/218.1
See application file for complete search history.

(56) References Cited

U.S. PATENT DOCUMENTS

| | | | |
|---|---|---|---|
| 3,675,012 A * | 7/1972 | Derderian et al. | 378/36 |
| 3,812,506 A * | 5/1974 | Klebanow | 396/5 |
| 5,497,188 A * | 3/1996 | Kaye | 348/36 |
| 5,568,189 A * | 10/1996 | Kneller | 348/144 |
| 5,625,435 A * | 4/1997 | Lo et al. | 355/22 |
| 6,337,683 B1 * | 1/2002 | Gilbert et al. | 345/418 |
| 6,669,346 B1 * | 12/2003 | Metcalf | 353/94 |
| 6,709,171 B1 * | 3/2004 | Wesselink et al. | 396/427 |
| 6,715,425 B1 * | 4/2004 | Dore | 104/53 |
| 6,839,081 B1 * | 1/2005 | Iijima et al. | 348/46 |
| 6,853,398 B1 * | 2/2005 | Malzbender et al. | 348/14.09 |
| 6,853,809 B1 * | 2/2005 | Pelletier | 396/85 |

\* cited by examiner

*Primary Examiner*—Thai Tran
*Assistant Examiner*—James M. Hannett
(74) *Attorney, Agent, or Firm*—Silicon Valley Patent Group; Edward S. Mao

(57) ABSTRACT

A multi-camera capture system is aligned using a capture system so that a subject remains in the field of view of a camera. In one embodiment of the present invention, the multi-camera system capture system is mounted on a camera platform. The camera platform is connected to a subject platform and the subject platform is constrained to remain in the field of view of a first camera of the multi-camera capture system. In another embodiment of the present invention, the multi-camera capture system is mounted on a camera platform that moves along a circular track system. The camera platform is configurable to align a first camera to capture a subject within the circular track system as the camera platform moves along the circular track system.

19 Claims, 12 Drawing Sheets

CAPTURE STRUCTURE FOR ALIGNMENT OF MULTI-CAMERA CAPTURE SYSTEMS

FIELD OF THE INVENTION

The present invention relates to environment mapping and immersive video. More specifically, the present invention relates to aligning multi-camera systems for optimal recording of a subject.

BACKGROUND OF THE INVENTION

As the processing power of microprocessors and the quality of graphics systems have increased, environment mapping systems have become feasible on personal computer systems. Environment mapping systems use computer graphics to display the surroundings or environment of a theoretical viewer. Ideally, a user of the environment mapping system can view the environment at any angle or elevation. FIG. 1(A) illustrates the construct used in conventional environment mapping systems. A viewer 105 is centered at the origin of a three dimensional space having x, y, and z coordinates. The environment of viewer 105 (i.e., what the viewer can see) is ideally represented by a sphere 110, which surrounds viewer 105. Generally, for ease of calculation, sphere 110 is defined with a radius of 1 and is centered at the origin of the three dimensional space. More specifically, the environment of viewer 105 is captured and then re-projected onto the inner surface of sphere 110. Viewer 105 has a view window 130 which defines the portion of sphere 110 viewer 105 can see at any given moment. View window 130 is typically displayed on a display unit for the user of the environment mapping system.

In many situations, the portions of an environment above and below user 105 are not relevant. For example, viewer 105 is standing in a building, details of the floor and ceiling may not be necessary. Thus, many environment mapping systems ignore these areas and use a cylindrical representation of the environment around user 105. FIG. 1(B) is a simplified graphical representation of a cylindrical texture projection of an environment surrounding viewer 105 in a second conventional environment mapping system. Viewer 105 is centered at the origin of a three dimensional space having x, y, and z coordinates. The environment of viewer 105 (i.e., what the viewer can see) is ideally represented by a cylinder 150, which surrounds viewer 105. Generally, for ease of calculation, cylinder 150 is defined with a radius of 1 and is centered at the origin of the three dimensional space. The height of cylinder 150 varies with different environment mapping systems. More specifically, the environment of viewer 105 is captured and then re-projected onto the inner surface of cylinder 150. Viewer 105 has a view window 130 which defines the portion of cylinder 150 viewer 105 can see at any given moment. View window 130 is typically displayed on a display unit for the user of the environment mapping system.

Conventional environment mapping systems include an environment capture system and an environment display system. The environment capture system creates an environment map which contains the necessary data to recreate the environment of viewer 105. The environment display system displays portions of the environment in view window 130 based on the field of view of the user of the environment display system. An environment display system is described in detail by Hashimoto et al., in co-pending U.S. patent application Ser. No. 09/505,337, entitled "POLYGONAL CURVATURE MAPPING TO INCREASE TEXTURE EFFICIENCY." Typically, the environment capture system includes a camera system to capture the entire environment of viewer 105. Specifically, the field of view of the camera system must encompass the totality of the inner surface of sphere 110 or cylinder 150.

An extension to environment mapping is generating and displaying immersive videos. Immersive videos involve creating multiple environment maps, ideally at a rate of at least 30 frames a second, and displaying appropriate sections of the multiple environment maps for viewer 105, also ideally at a rate of at least 30 frames a second. Immersive videos are used to provide a dynamic environment rather than a single static environment as provided by a single environment map. Alternatively, immersive video techniques allow the location of viewer 105 to be moved. For example, an immersive video can be made to capture a flight in the Grand Canyon. The user of an immersive video display system would be able to take the flight and look out at the Grand Canyon at any angle. Camera systems for environment mappings can be easily converted for use with immersive videos by using video cameras in place of still image cameras.

Many conventional camera systems exist to capture the entire environment of viewer 105. For example, cameras can be adapted to use hemispherical lens to capture a hemisphere of sphere 110, i.e. half of the environment of viewer 105. By using two camera with hemispherical lens the entire environment of viewer 105 can be captured. However, the images captured by a camera with a hemispherical lens require intensive processing to remove the distortions caused by the hemispherical lens. Furthermore, two-cameras systems provide less resolution than systems having more than two cameras.

Other environment capturing camera systems use multiple outward facing cameras. FIG. 2 depicts an outward facing camera system 200 having six cameras 211–216 facing outward from a center point C. Outward facing camera system 200 captures a cylindrical portion of the environment. Camera 211 is directed to capture data representing a region 221 of the environment surrounding camera system 200. Similarly, cameras 212–216 are directed to capture data representing regions 222–226, respectively. The data captured by cameras 211–216 is then combined in a cylindrical environment display system (not shown) to create a corresponding environment map from the perspective of viewer 105. Outward facing camera system 200 can be augmented to capture spherical environments by adding cameras to capture the portions of the environment above and below the portions captured by the cameras shown in FIG. 2.

A parallax problem associated with camera system 200 is produced when two cameras capture a single object. This occurs when an object is located in a region (referred to herein as an "overlap region") that is located in two or more capture regions. For example, overlapping portions of capture region 221 and capture region 222 form overlap region 241. Any object (not shown) located in overlap region 241 is captured both by camera 211 and by camera 212. Similar overlap regions 242–246 are indicated for each adjacent pair of cameras 212–216. Because the viewpoint of each camera is different (i.e., adjacent cameras are separated by a distance D), the object is simultaneously captured from two different points of reference, and the captured images of the object are therefore different. Accordingly, when the environment map data from both of these cameras is subsequently combined in an environment display system, the environment display system is able to merge portions of the image captured by the two cameras that are essentially identical, but produces noticeable image degradation in the regions wherein the images are different.

Another camera system for cylindrical environment capture is illustrated in FIGS. 3(a) and 3(b). Specifically, FIG. 3(a) shows a cross-sectional view of a pyramidal mirror camera system 300. Pyramidal mirror camera system 300 includes a mirror mounting bar 310, a top plate 320, a plurality of mirrors including a mirror 332 and a mirror 336, a camera mounting bar 340, and a plurality of cameras including a camera 352 and a camera 356. Top plate 320 is attached to mirror mounting bar 310. The plurality of mirrors including mirrors 332 and 336 are attached to top plate 320 and mirror mounting bar 310 at a 45 degree angle with respect to mirror mounting bar 310. The plurality of mirrors form a pyramid shape. The specific number of mirrors may differ. For example, pyramidal-mirror camera systems using 9 mirrors, 8 mirrors and 4 mirrors have been developed.

The plurality of cameras, including cameras 352 and 356 are mounted to camera mounting bar 340, which is attached to mirror mounting bar 310, so that the plurality of cameras point toward the plurality of mirrors. Specifically, each camera is aligned with one mirror so that the mirror redirects the field of view of the aligned camera outward from the pyramid formed by the mirrors. Typically, the field of view of a camera is given as an angular measurement. However, for clarity, field of views are shown in the figures as projections from the nodal point of the camera. For example, the field of view of camera 352 is redirected by mirror 332 to form a field of view 362. Similarly, the field of view of camera 356 is redirected by mirror 336 to form a field of view 366. By surrounding mirror mounting bar 310 and camera mounting bar 340 with aligned mirrors and cameras, respectively, a 360 degree environment surrounding mirror mounting bar 310 can be captured by pyramidal mirror camera system 300.

Field of view 362 is equivalent to the field of view of a camera having a nodal point near point 370 and facing mirror 332 and parallel to top plate 320. Thus, camera 352 is said to have a virtual nodal point near point 370. Similarly, field of view 366 is equivalent to the field of view of a camera having a nodal point near point 370 and facing in the direction of field of mirror 336 and parallel to top plate 320. Thus, camera 356 is also said to have a virtual nodal point near point 370. In addition, the other cameras of the plurality of cameras would also be configured to have virtual nodal points at or near point 370. By having the virtual nodal point in close proximity, the parallax and blind spot problems associated with outward facing camera systems are greatly minimized in pyramidal mirror camera system 300.

FIG. 3(b) shows a view of pyramidal mirror camera system 300 from beneath the pyramid formed by the mirrors but above the plurality of cameras. Specifically, FIG. 3(b) shows mirrors 331–338 coupled to top plate 320 and the bottom of mirror mounting bar 310. Mirrors 331–338 are trapezoids rather than triangles to facilitate mounting of mirrors 331–338 to mirror mounting bar 310. Other pyramidal camera systems may use triangular mirrors. FIG. 3(b) also shows the reflection of lens 351L–358L of cameras 351–358 (not shown in FIG. 3(b)) to illustrate the alignment of the mirrors and the cameras.

FIGS. 4(a) and 4(b) illustrate how separate video streams from a multi-camera capture system can be arranged into an immersive video containing a plurality of cylindrical environment map. Specifically video streams 421–428 are captured using a multi-camera capture system, such as an eight-camera version of outward facing camera system 200 or pyramidal mirror camera system 300. Corresponding frames of video streams 421–428 are joined to form cylindrical environment maps, such as cylindrical environment map 450, using conventional image blending techniques. The sequence of cylindrical environment maps forms the immersive video stream. Wherever an image joins another image, a seam may be visible. For example, seam 431 may be visible between video stream 421 and video 422 in cylindrical environment map 450. Similarly, seams 432, 433, 434, 435, 436, 437 and 438 may also be visible in cylindrical environment map 450. Because the corresponding frames of video streams are usually joined using the same technique, the seams exist in each environment map forming the immersive video. Seams typically appear as a distortion in the immersive video and are especially noticeable if a moving object passes across the seam during the immersive video. Current image blending techniques generally can not completely eliminate the seams in cylindrical environment map 450. Hence, there is a need for a method to minimize the distortions caused by seams in an immersive video.

SUMMARY

Accordingly, a first camera of a multi-camera capture system is aligned with a subject so that the field of view of the first camera remains on the subject. Thus, the subject does not cross a seam in the immersive video sequence. Alternatively, the crossing of seams by the subject can be predetermined based on the movement of the multi-camera capture system within a capture structure.

In accordance with one embodiment of the present invention, a camera platform and a subject platform are coupled together by a connector. The multi-camera capture system is mounted on the camera platform. The location of the subject platform is restricted to the field of view of a first camera of the multi-camera capture system. Some embodiments of the present invention rigidly attaches the camera platform to the subject platform. Other embodiments may let the subject platform revolve around the camera platform or allow the distance between the subject platform and the camera platform to vary.

In another embodiment of the present invention, a capture structure includes a camera platform and a circular track system. The camera platform is configured to move along the circular track system The multi-camera capture system is mounted on the camera platform and the subject to be captured is encompassed by the circular track system. Some embodiments of the present invention also includes a subject platform for the subject within the circular track system. In some embodiments, the subject platform can rotate. Rotation of the subject platform can be coordinated with the movement of the camera system along the circular track system. The camera platform is configurable to align a first camera of the multi-camera capture system to capture the subject as the camera platform moves along the circular track system. Some embodiments also allow the camera platform to be configured to align the first camera of the multi-camera capture system in a fixed direction as the camera platform moves along the circular track system.

The present invention will be more fully understood in view of the following description and drawings.

DETAILED DESCRIPTION

Figure 1A:
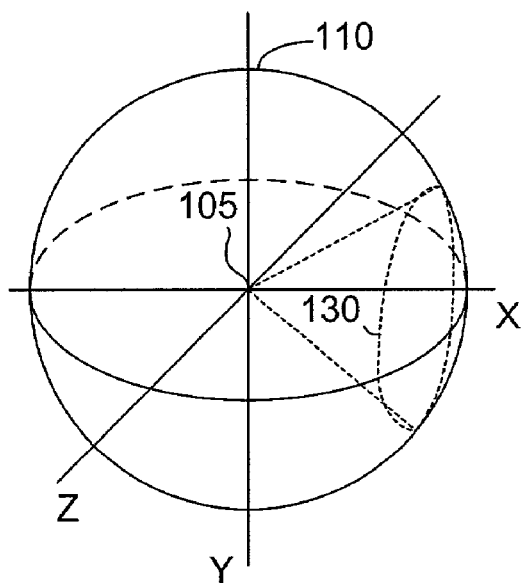
FIGS. 1(a) and 1(b) are three-dimensional representation of a user and an environment.
Figure 1B:
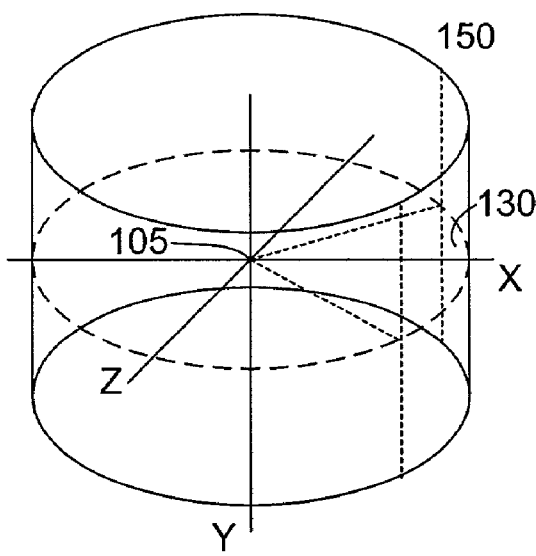
Figure 2A:
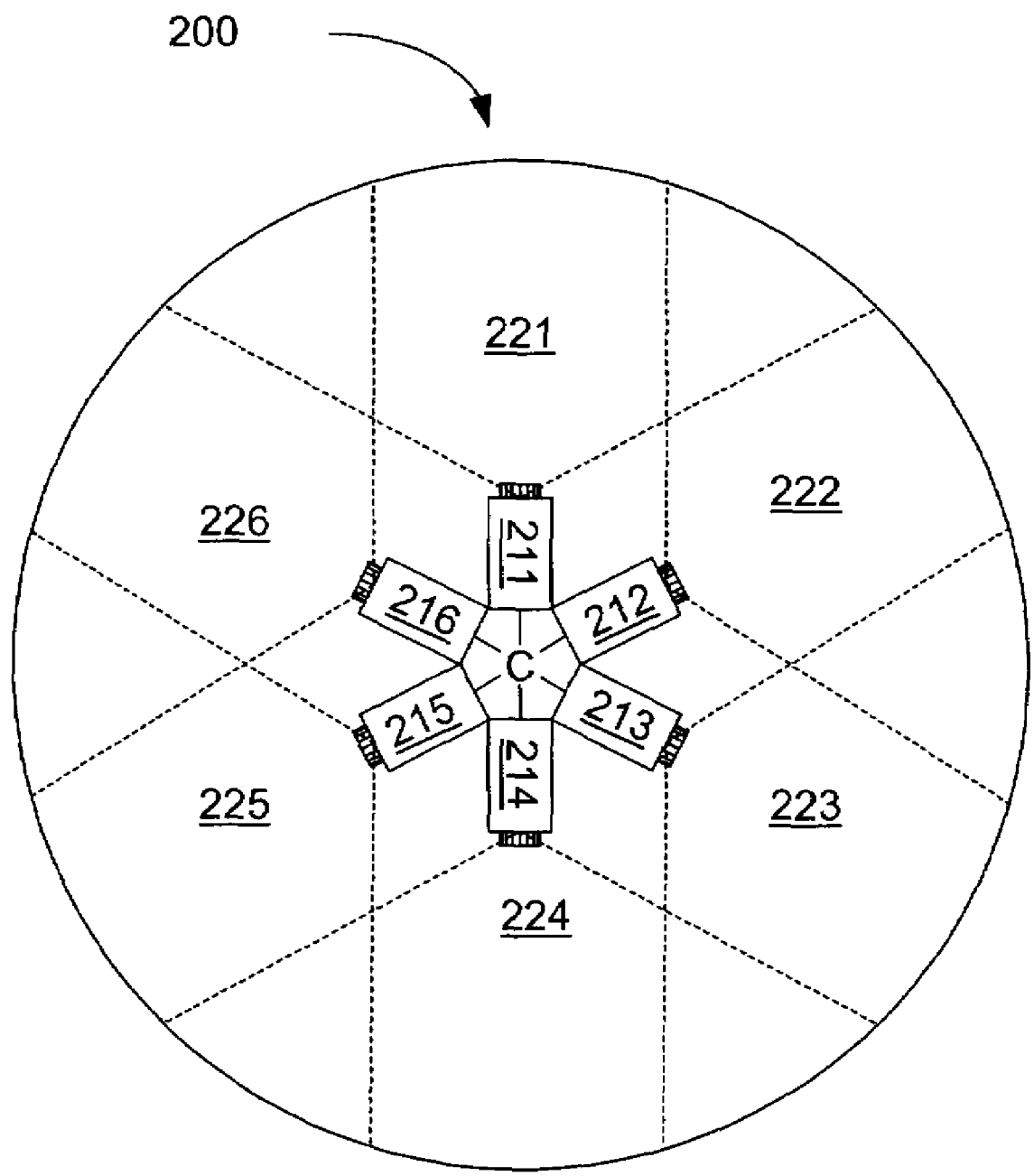
FIG. 2 is a simplified diagram of a conventional outward facing camera system.
Figure 2B:
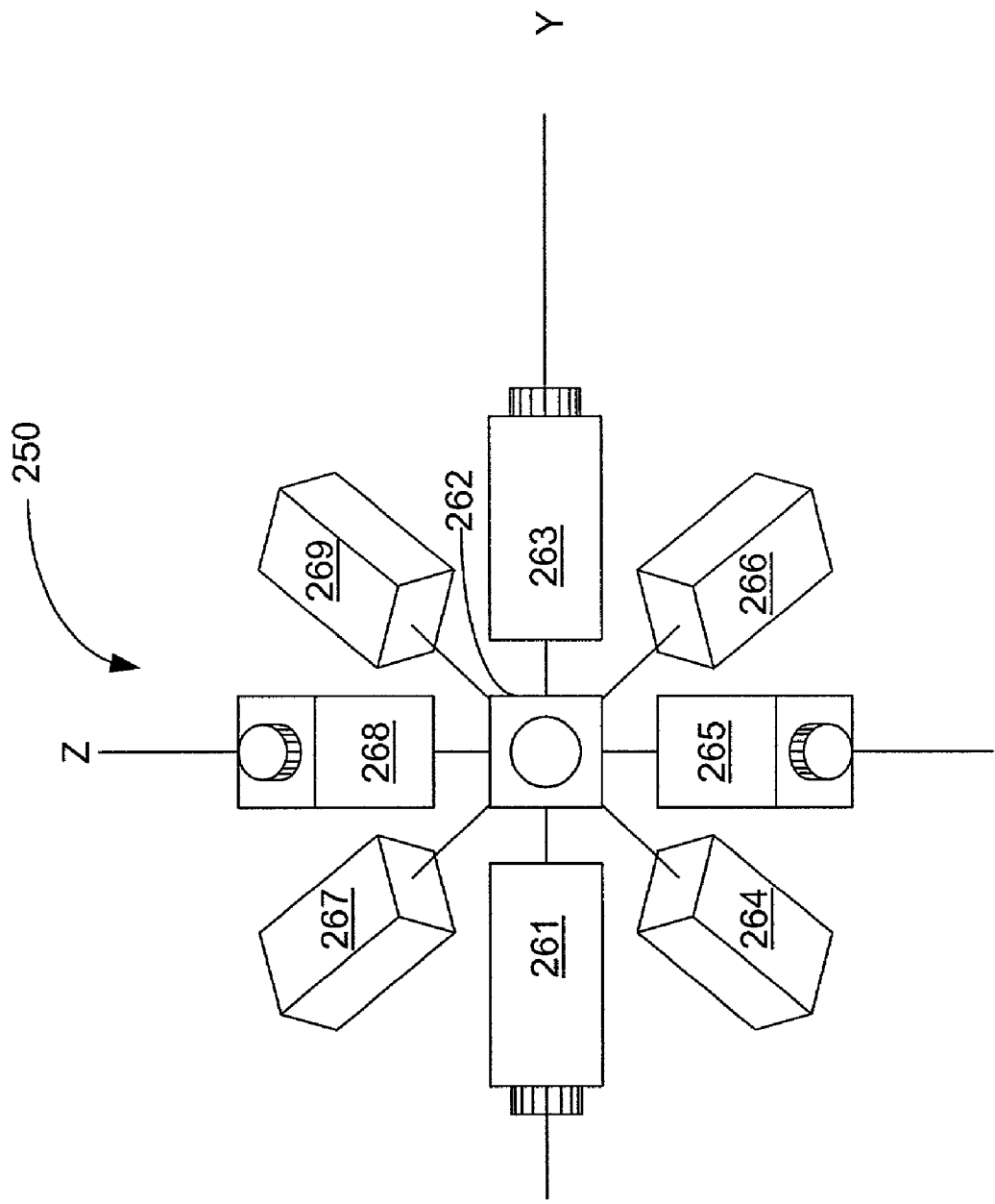
Figure 3A:
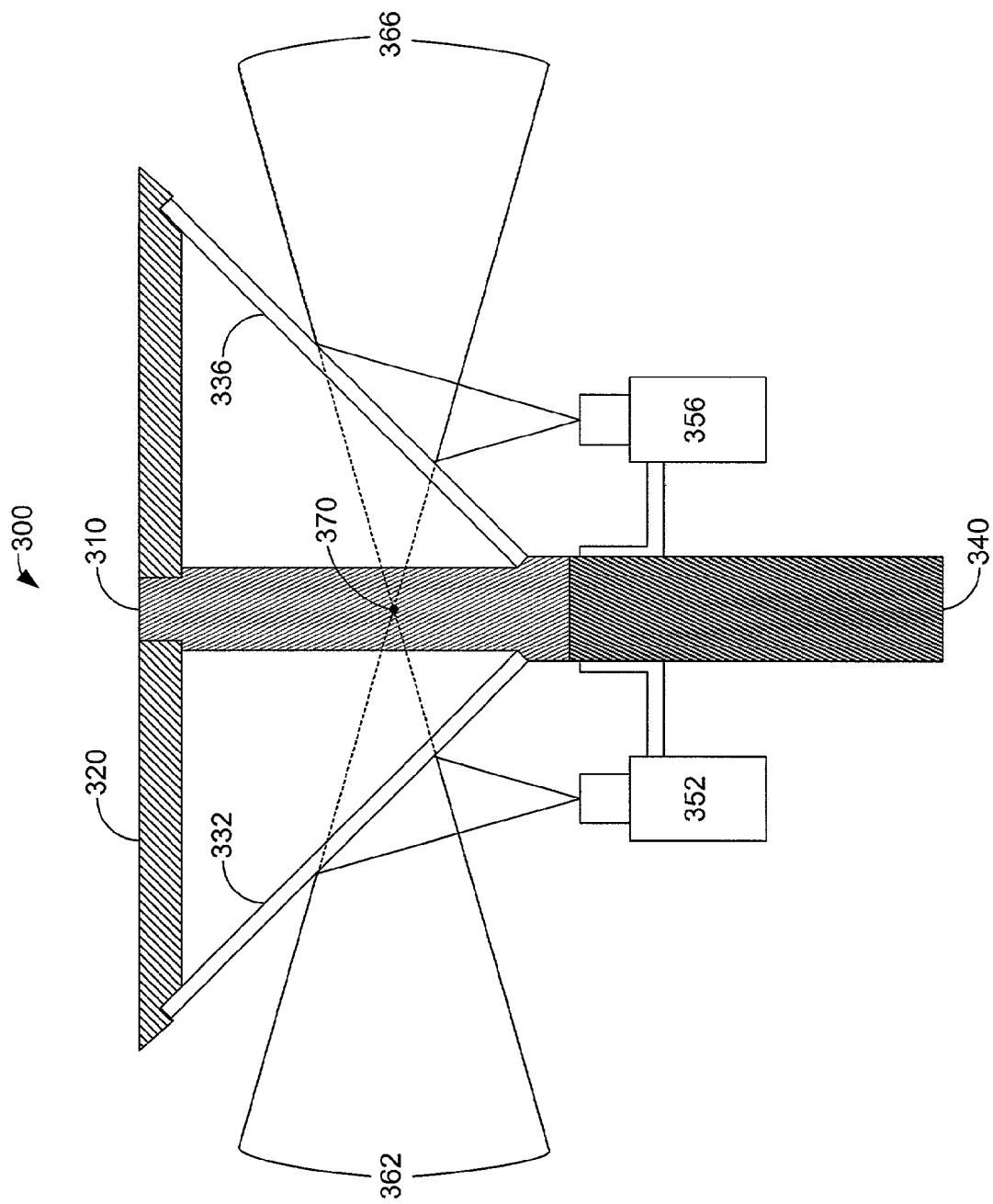
FIG. 3(a) is a cross sectional view of a conventional pyramidal mirror camera system.
Figure 3B:
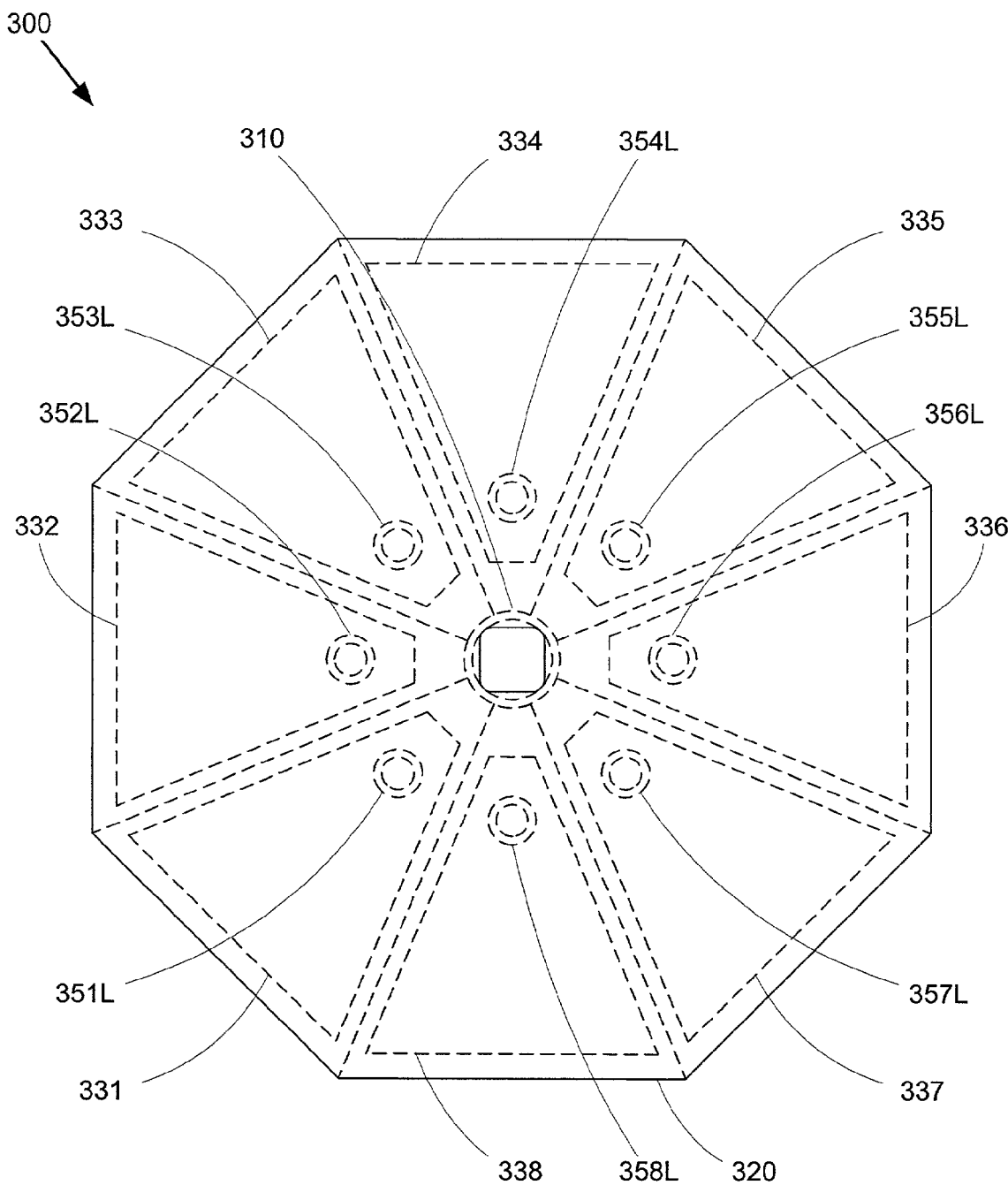
FIG. 3(b) is a diagram of a pyramidal mirror system used in pyramidal mirror camera systems.
Figure 4A:
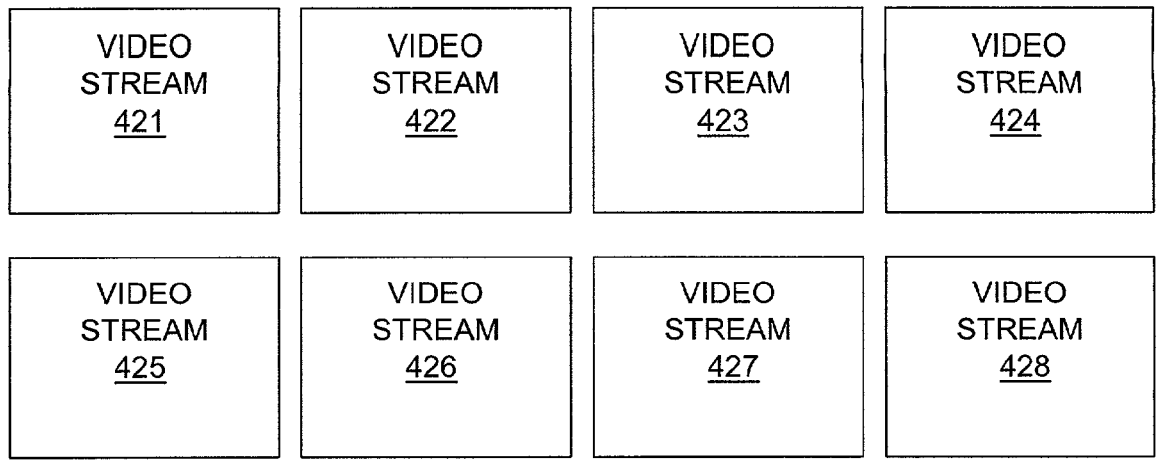
FIGS. 4(a)–4(b) illustrate the stitching of the video streams from a multi camera capture system to form an environment map.
Figure 4B:
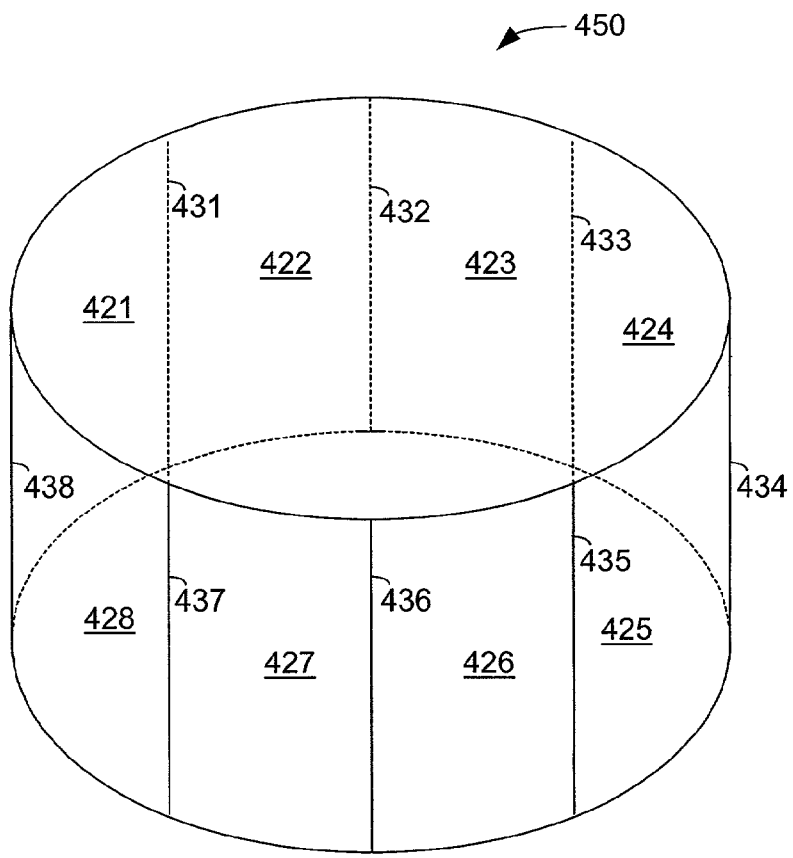
Figure 5:
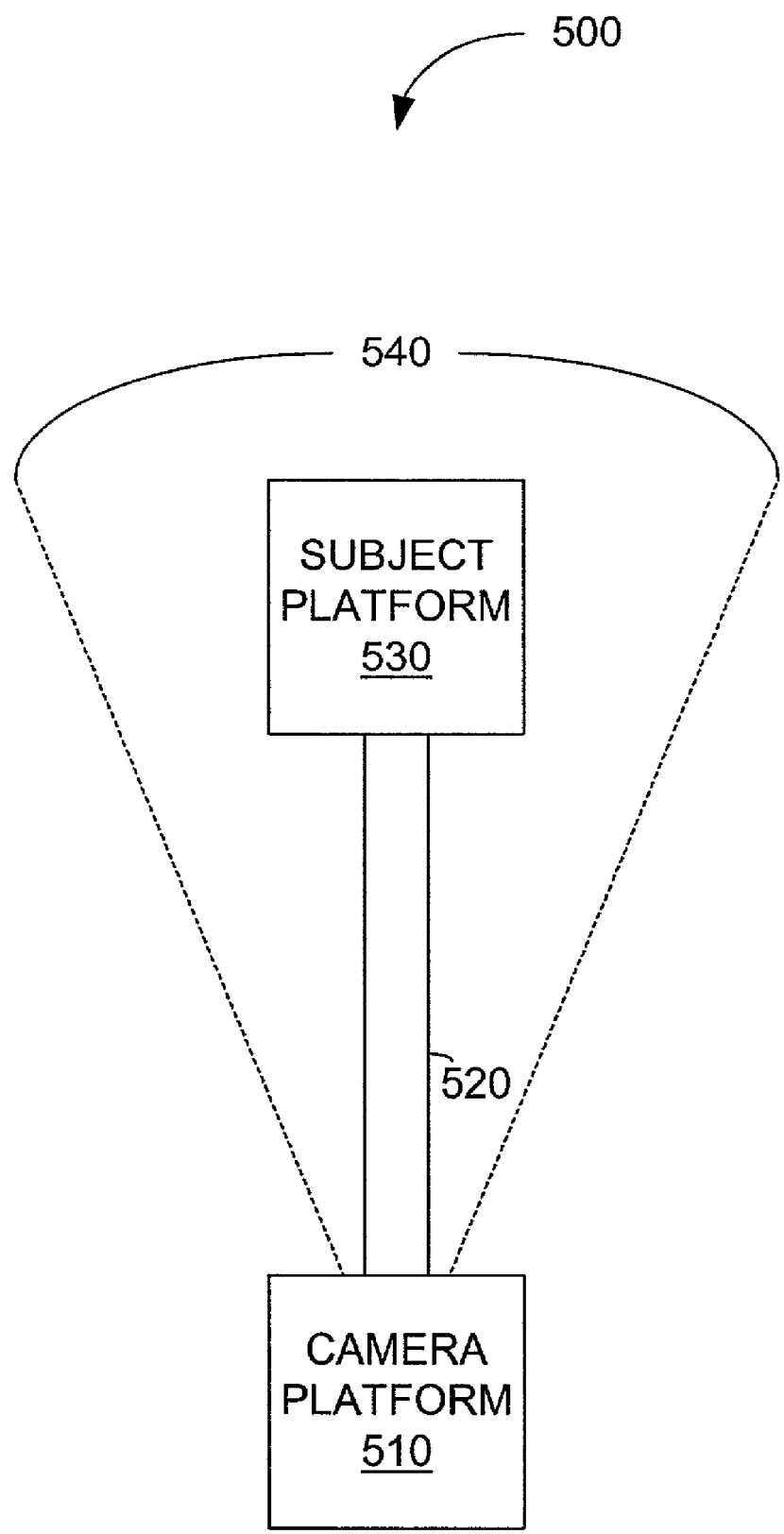
FIG. 5 illustrates a capture structure in accordance with one embodiment of the present invention.

As explained above, seams occur when two images are joined together. Thus, from the perspective of a multi-capture camera system, the seams would appear where the field of view of one camera intersects the field of view of a second camera. Thus, in accordance with one embodiment of the present invention, the multi-camera capture system is arranged so that a subject remains in the field of view of a first camera throughout the immersive video. FIG. 5 illustrates a capture structure 500 for aligning the multi-camera capture system in accordance with one embodiment of the present invention. Specifically, capture structure includes a camera platform 510, a connector 520, and a subject platform 530. Camera platform 510 and subject platform 530 are coupled together by connector 520 so that subject platform 530 would be contained within a field of view 540 of a first camera (not shown) of a multi camera capture system (not shown) mounted on camera platform 510. By restricting the movement of a subject (not shown) to subject platform 530, the subject will not cross a seam of an immersive video formed from the video streams of a multi-camera capture system mounted on camera platform 510. Generally, camera platform 510, connector 520, and subject platform 530 are mobile so that dynamic high motions scenes can be captured using capture structure 500.

In some embodiments of the present invention, subject platform 530 is rigidly attached to camera platform 510 so that subject platform 530 can not move relative to camera platform 510. In other embodiments of the present invention, connector 520 may be retractable so that the distance between subject platform 530 and camera platform 510 can be varied. Some embodiments of the present invention may also allow subject platform 530 to revolve about camera platform 510 within field of view 540.

Figure 6:
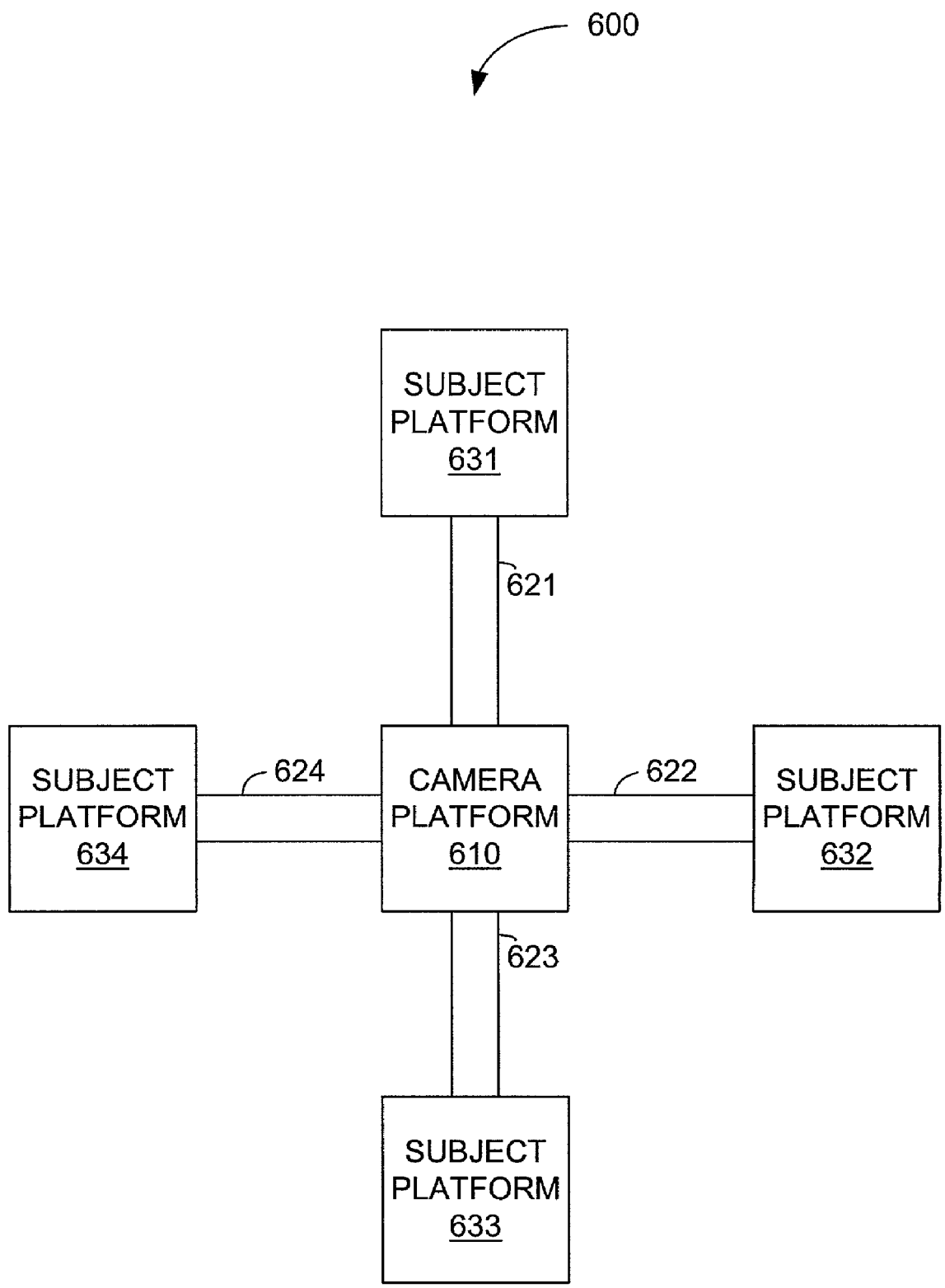
FIG. 6 illustrates a capture structure in accordance with one embodiment of the present invention.

As illustrated in FIG. 6, some embodiments of the present invention includes subject platforms for multiple cameras. Specifically the capture structure 600 of FIG. 6, includes four subject platforms 631, 632, 633, and 634 coupled to a camera platform 610 by connectors 621, 622, 623, and 624, respectively. Capture structure 600 is suited for multi-camera capture systems where each subject platform is encompassed by the field of view of a camera of the multi-camera capture system. For example, a multi-camera capture system having four cameras, where each camera has a field of view of approximately 90 degrees, can be used with capture structure 600. Capture structure 600 can also be used with a multi-camera capture system having eight cameras, where each camera has a field of view of approximately 45 degrees.

Figure 7:
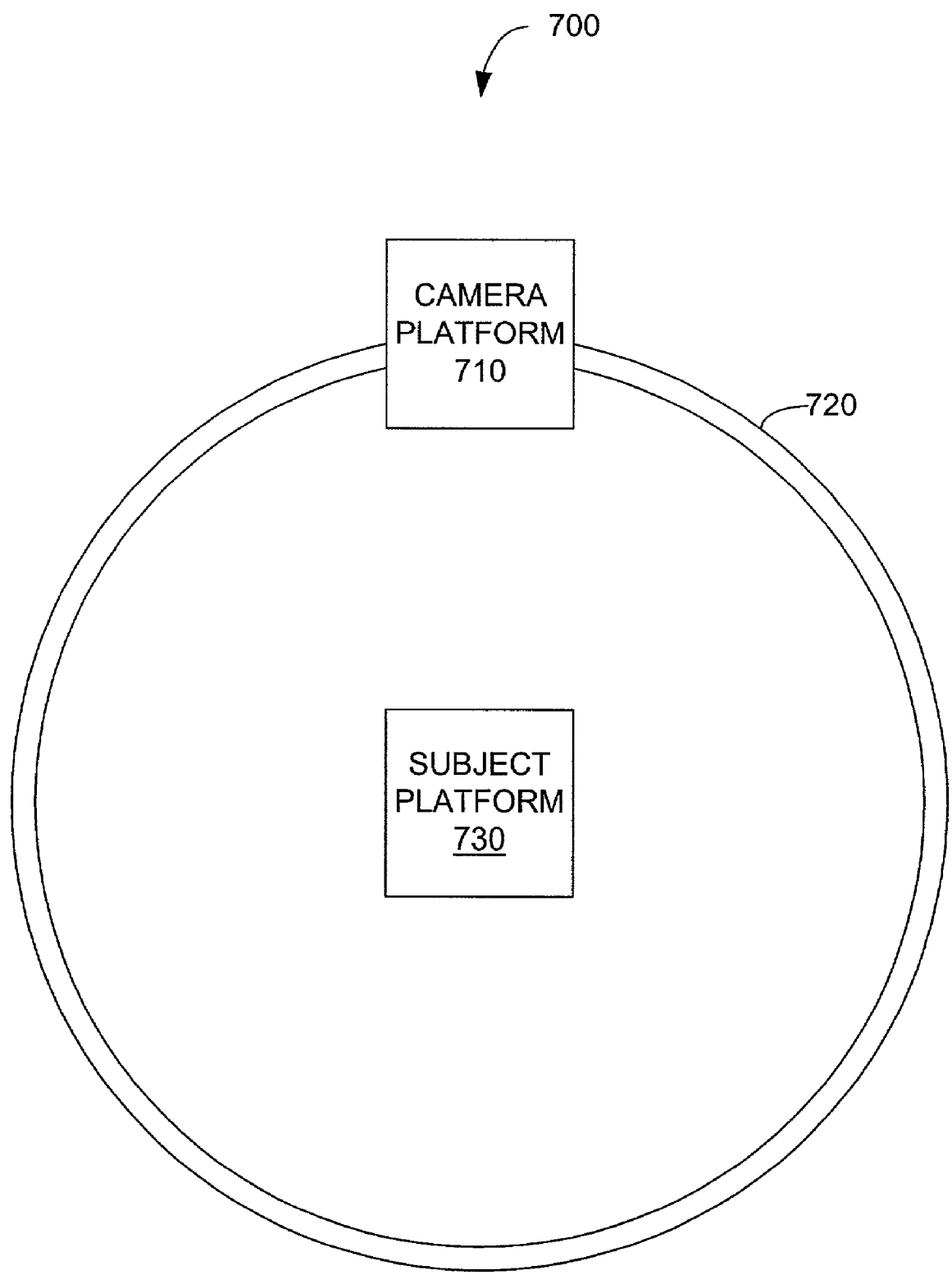
FIG. 7 illustrates a capture structure in accordance with one embodiment of the present invention.

FIG. 7 illustrates another embodiment of the present invention. The embodiment of FIG. 7 includes a camera platform 710 mounted on a circular track system 720 which surrounds a subject platform 730. Camera platform 710 is configurable so that a field of view of a first camera of multi-capture camera system mounted on camera platform 710 would encompass subject platform 730. In some embodiments of the present invention, subject platform 730 is configured to rotate. The rotation of subject platform 730 can be coordinated with the movement of camera platform 710. For example, in one embodiment of the present invention, subject platform 730 is configured to rotate and camera platform 710 is configured to revolve at the same rate. However, in other embodiments of the present invention, Camera platform 710 can move along track 720 independently of subject platform 730. If the movement of camera platform 710 is not coordinated with subject platform 730, subject platform 730 is often omitted.

Figure 8:
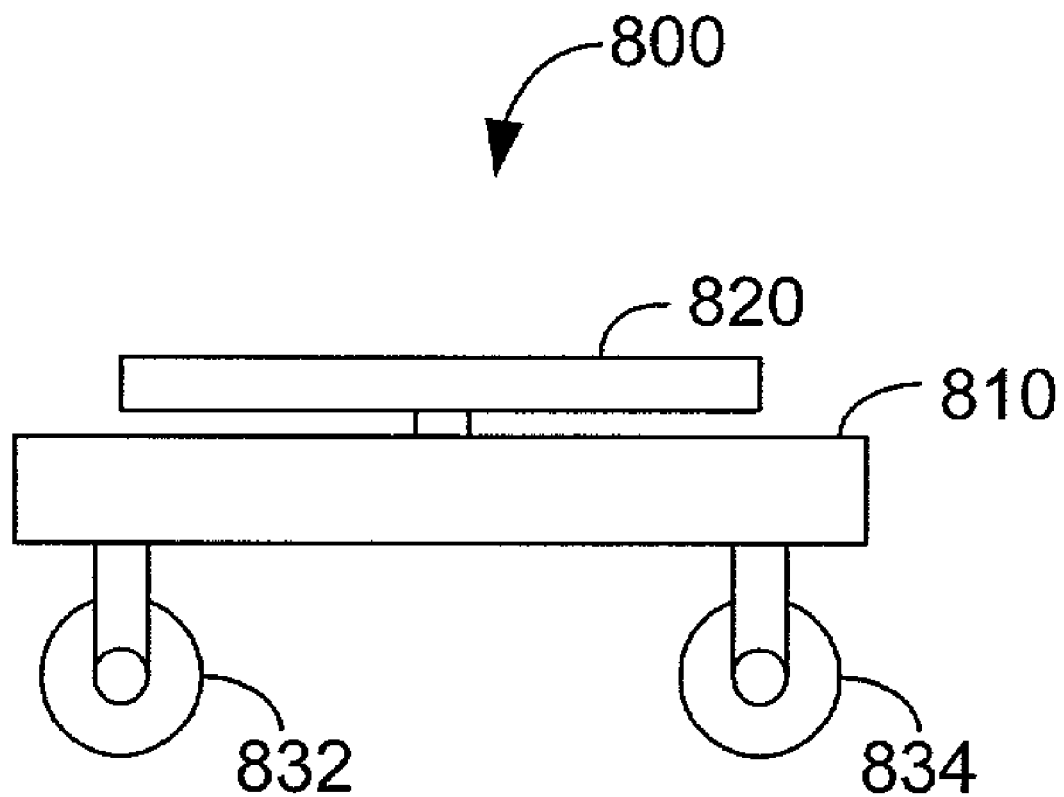
FIG. 8 illustrates a camera platform in accordance with one embodiment of the present invention.

FIG. 8 shows a camera platform 800 in accordance with one embodiment of the present invention. FIG. 8 provides a side view of camera platform 800. Camera platform 800 includes a base platform 810, a rotatable pedestal 820, and wheels 832 and 834. Rotatable pedestal 820 is mounted on base platform 810. In some embodiments of camera platform a locking mechanism is included to prevent rotatable pedestal 820 from rotating. Wheels 832 and 834 are mounted to base platform 810 so that camera platform 800 is mobile. For example, camera platform 810 can be used with track 720 (FIG. 7) so that camera platform 800 can move around a subject on subject platform 730. In some embodiments of the present invention, a multi-camera capture system includes a rotatable support structure. For these embodiments, rotatable pedestal can be removed and the function of rotatable pedestal 820 can be replaced by the rotatable support structure of the multi-camera capture system.

Figure 9:
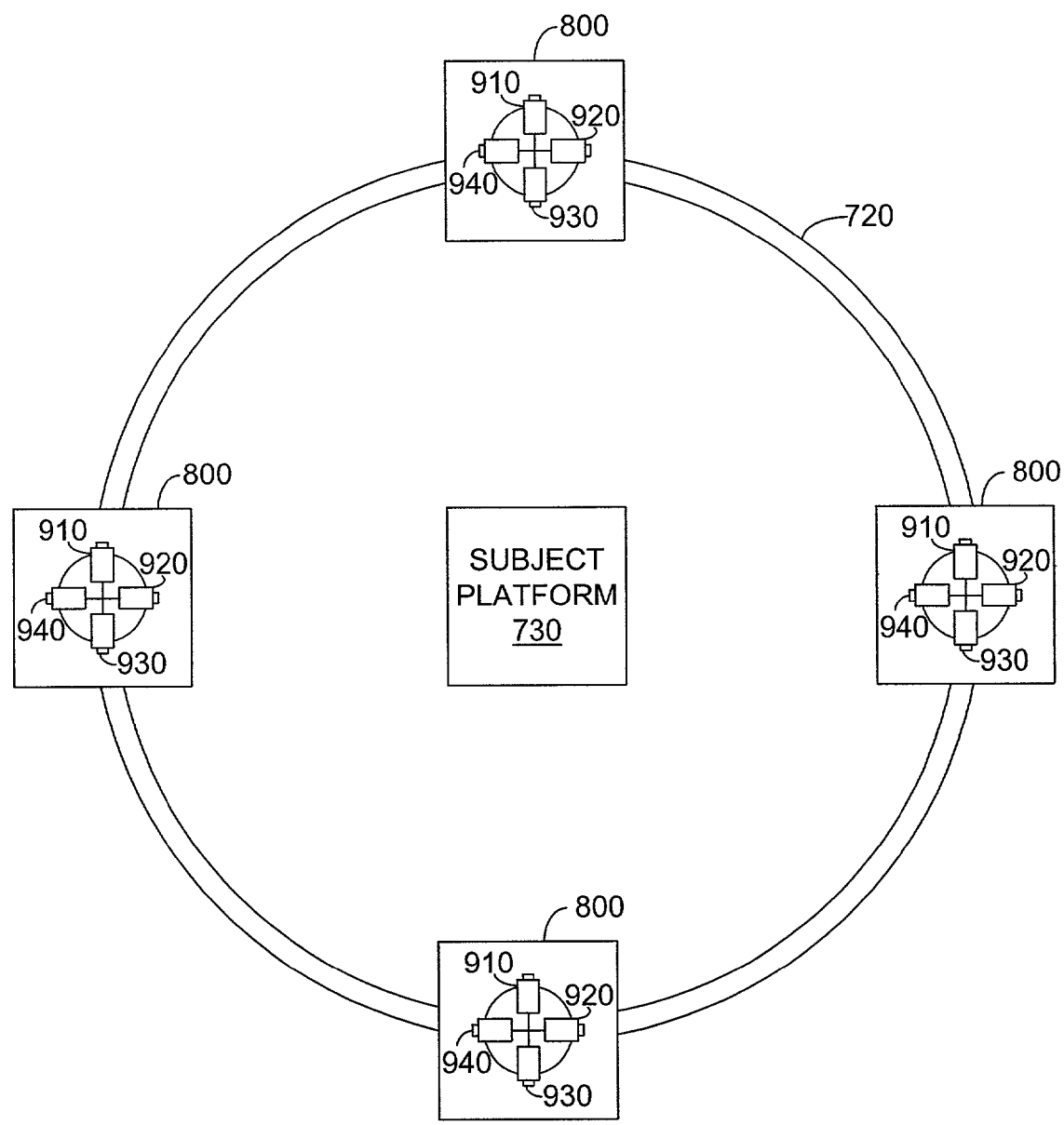
FIG. 9 illustrates use of a capture structure in accordance with one embodiment of the present invention.

Various forms of immersive videos can be captured using camera platform 800. For example, rotatable pedestal 820 can be configured to rotate with the movement of camera platform 800 around track 730 so that a camera of a multi-camera capture system mounted on camera platform 800 would always point in a fixed direction. Thus, as camera platform 800 revolves about subject platform 730, different cameras would capture the subject on subject platform 730. FIG. 9 illustrates the positioning of a multi-camera capture system 900 having cameras 910, 920, 930, and 940 mounted on camera platform 800 in various positions around subject platform 730. As illustrated in FIG. 9, camera platform 800 is configured to keep camera 910 always faces up (relative to FIG. 9). Similarly, cameras 920, 930, and 940 always points left, down, and right, respectively. Thus, when camera platform 800 is directly above subject platform 730, camera 930 captures subject platform 730. When camera platform 800 is directly left of subject platform 730, camera 920 captures subject platform 730. When camera platform 800 is directly below subject platform 730, camera 910 captures subject platform 730. When camera platform 800 is directly right of subject platform 730, camera 940 captures subject platform 730. In this configuration, the subject on subject platform 730 would pass through seams of the immersive video. However, the actual moment of passing through the seems can be determined based on the location of camera platform 800 and can thus be controlled to minimize distortions.

Figure 10:
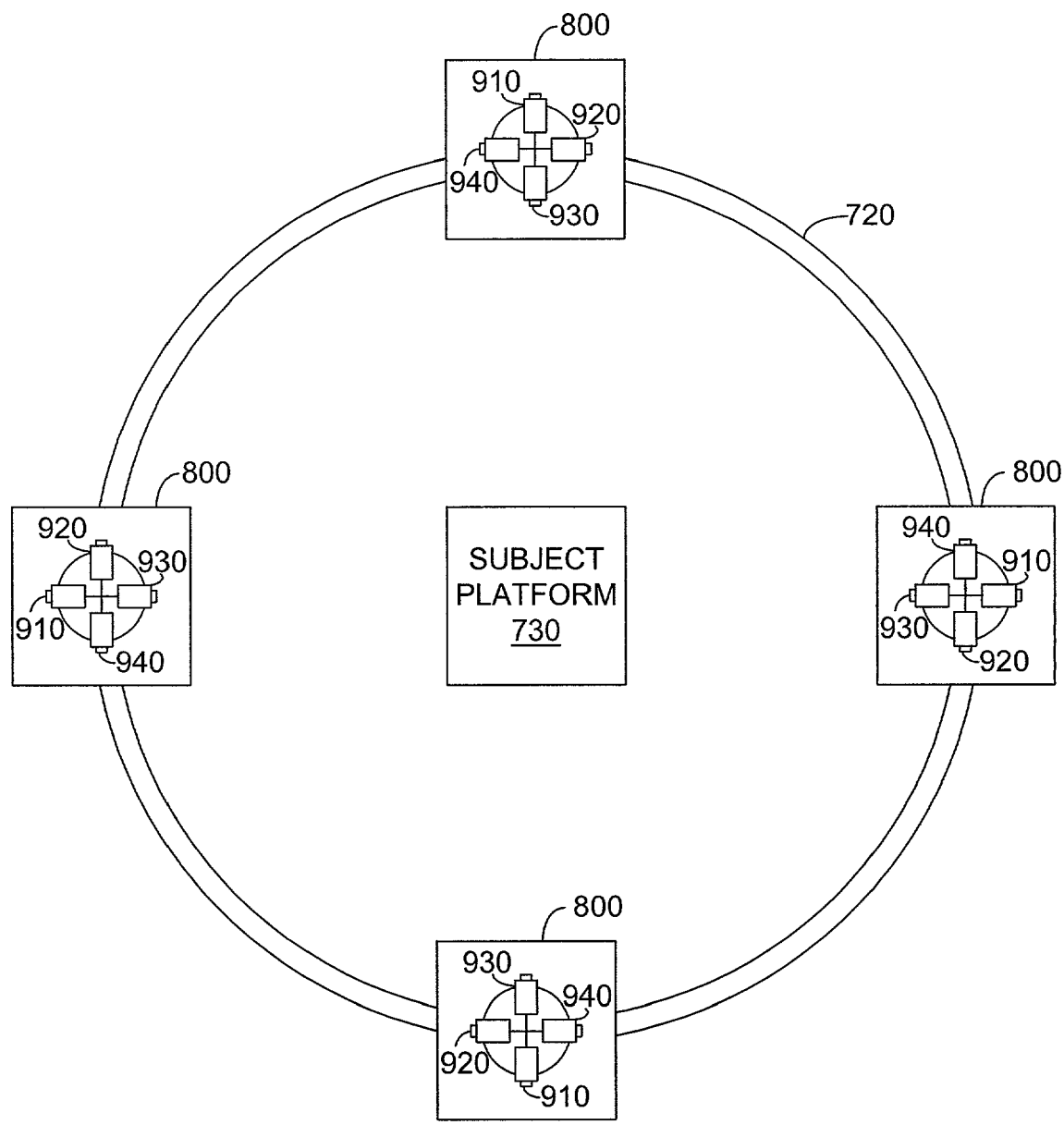
FIG. 10 illustrates use of a capture structure in accordance with one embodiment of the present invention.

Alternatively, rotatable pedestal 820 can be configured to keep a particular camera locked onto subject platform 730 as camera platform 800 revolves around subject platform 730. FIG. 10 illustrates the positioning multi-camera capture system 900 using this technique. As illustrated in FIG. 10, camera platform 800 is configured to keep camera 930 pointed at subject platform 730 as camera platform 800 revolved around subject platform 730. Thus, when camera platform 800 is directly above subject platform 730, camera 930 points down. When camera platform 800 is directly left of subject platform 730, camera 930 points right. When camera platform 800 is directly below subject platform 730, camera 930 points up. When camera platform 800 is directly right of subject platform 730, camera 930 points left.

In the various embodiments of this invention, novel structures and methods have been described to insure a subject of an immersive video does not cross a seam of the immersive video. By restricting a subject to a subject platform encompassed by the field of view of a first camera of a multi-camera capture system, the subject is prevented from crossing the seam of an immersive video. Alternatively, the movement of the multi-camera capture system can be controlled to only allow the subject to cross a seam at predetermined locations. The various embodiments of the structures and methods of this invention that are described above are illustrative only of the principles of this invention and are not intended to limit the scope of the invention to the particular embodiments described. For example, in view of this disclosure, those skilled in the art can define other camera platforms, rotatable pedestals, subject platforms, tracks, connectors, field of views, multi-camera capture systems, and so forth, and use these alternative features to create a method or system according to the principles of this invention. Thus, the invention is limited only by the following claims.

What is claimed is:

1. A capture structure for a multi-camera capture system comprising:
   a camera platform configured to hold the multi-camera capture system;
   a connector coupled to the camera platform; and
   a subject platform coupled to connector, wherein the location of the subject platform is restricted to a field of view of a first camera of the multi-camera capture system, and wherein the connector is retractable and a distance between the subject platform and the camera platform is variable.

2. A capture structure for a multi-camera capture system comprising:
   a camera platform configured to hold the multi-camera capture system;
   a connector coupled to the camera platform;
   a subject platform coupled to connector, wherein the location of the subject platform is restricted to a field of view of a first camera of the multi-camera capture system;
   a second connector; and
   a second subject platform coupled to the second connector, wherein the location of the second subject platform is restricted to a field of view of a second camera of the multi-camera capture system.

3. The capture structure of claim 1, claim 2, further comprising:
   a third connector; and
   a third subject platform coupled to the third connector, wherein the location of the third subject platform is restricted to a field of view of a third camera of the multi-camera capture system.

4. A method of operating a multi-camera capture system, the method comprising
   mounting the multi-camera capture system to a camera platform;
   capturing a first subject on a first subject platform with a first camera of the multi-camera capture system, wherein the first subject platform is coupled to the camera platform and constrained to a field of view of the first camera; and
   changing the distance between the first subject platform and the camera platform.

5. The method of operating a multi-camera capture system of claim 4, further comprising moving the camera platform and the first subject platform in unison.

6. The method of operating a multi-camera capture system of claim 4, further comprising revolving the first subject platform about the camera platform within the field of view of the first camera.

7. A method of operating a multi-camera capture system, the method comprising:
   mounting the multi-camera capture system to a camera platform;
   capturing a first subject on a first subject platform with a first camera of the multi-camera capture system, wherein the first subject platform is coupled to the camera platform and constrained to a field of view of the first camera; and
   capturing a second subject on a second subject platform with a second camera, wherein the second subject platform is coupled to the camera platform and constrained to a field of view of the second camera.

8. A capture structure for a multi-camera capture system comprising:
   a circular track system;
   a camera platform configured to hold the multi-camera capture system and configured to move along the circular track system; and
   a subject platform encompassed by the circular track system.

9. The capture structure of claim 8, wherein the subject platform is configured to rotate.

10. The capture structure of claim 9, wherein rotation of the subject platform is coordinated with movement of the camera platform along the circular track system.

11. A capture structure for a multi-camera capture system comprising:
    a circular track system; and
    a camera platform configured to hold the multi-camera capture system and configured to move along the circular track system, wherein the camera platform is configurable to align a first camera of the multi-camera capture system to capture a subject located within the circular track system as the camera platform moves along the circular track system.

12. The capture structure of claim 8, wherein the camera platform is configurable to lock a first camera of the multi-camera capture system to capture a fixed direction as the camera platform moves along the circular track system.

13. The capture structure of claim 8, wherein the camera platform comprises:
   a base platform; and
   a plurality of wheels coupled to the base platform.

14. The capture structure of claim 13, wherein the camera platform includes a rotatable pedestal coupled to the base platform.

15. A method of operating a multi-camera capture system, the method comprising
   mounting the multi-camera capture system to a camera platform; and
   moving the camera platform along a circular track system while capturing a first subject within the circular track system.

16. The method of operating a multi-camera capture system of claim 15, further comprising aligning a first camera of the multi-camera capture system to capture the first subject as the camera platform moves along the circular track system.

17. The method of operating a multi-camera capture system of claim 15, further comprising aligning a first camera of the multi-capture system to point in a fixed direction as the camera platform moves along the circular track system.

18. The method of operating a multi-camera capture system of claim 15, further comprising rotating a subject platform below the first subject.

19. The method of operating a multi-camera capture system of claim 18, wherein rotation of the first subject platform is coordinated with movement of the camera platform.

* * * * *